W. D. ROBERTS.
HAY STACKER.
APPLICATION FILED JULY 26, 1909.
967,975.
Patented Aug. 23, 1910.
3 SHEETS—SHEET 1.
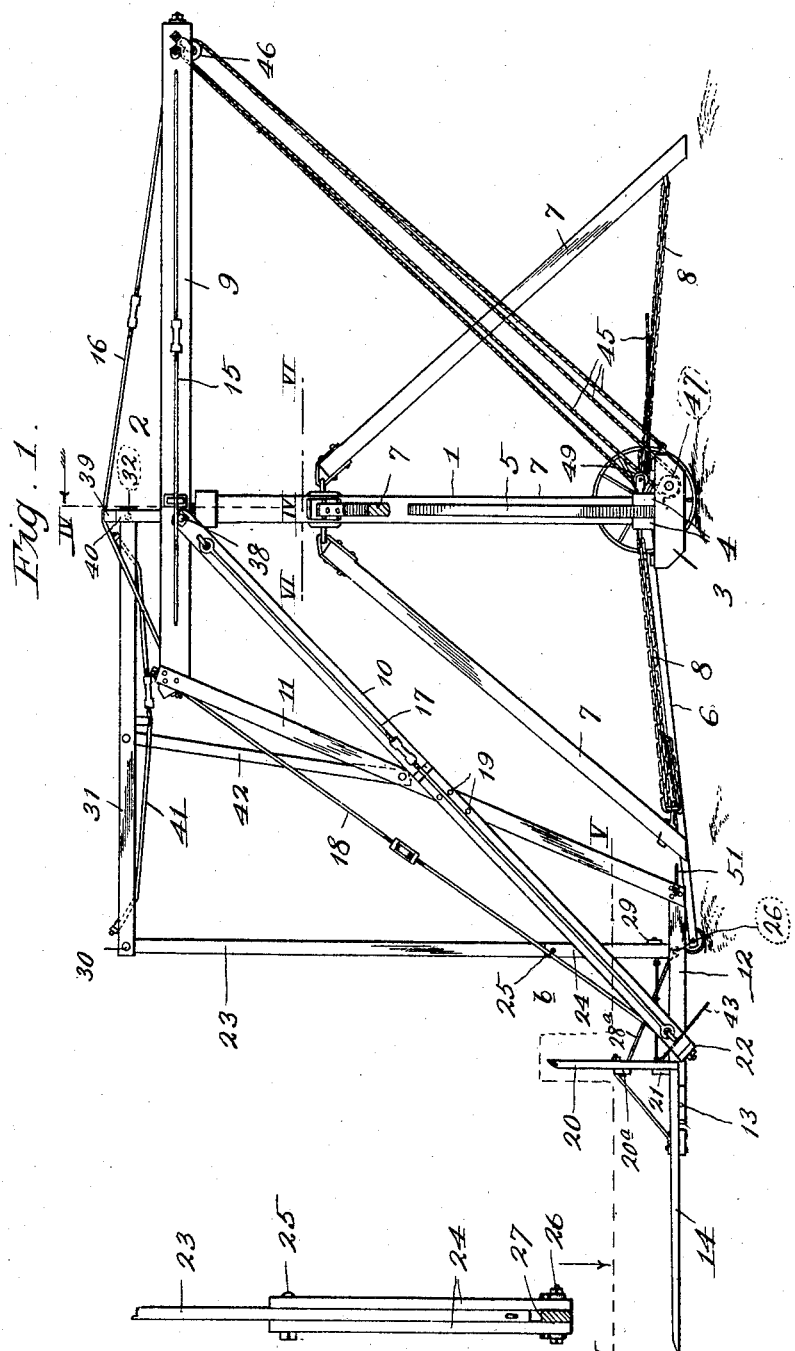

W. D. ROBERTS.
HAY STACKER.
APPLICATION FILED JULY 26, 1909.
967,975.
Patented Aug. 23, 1910.
3 SHEETS—SHEET 2.
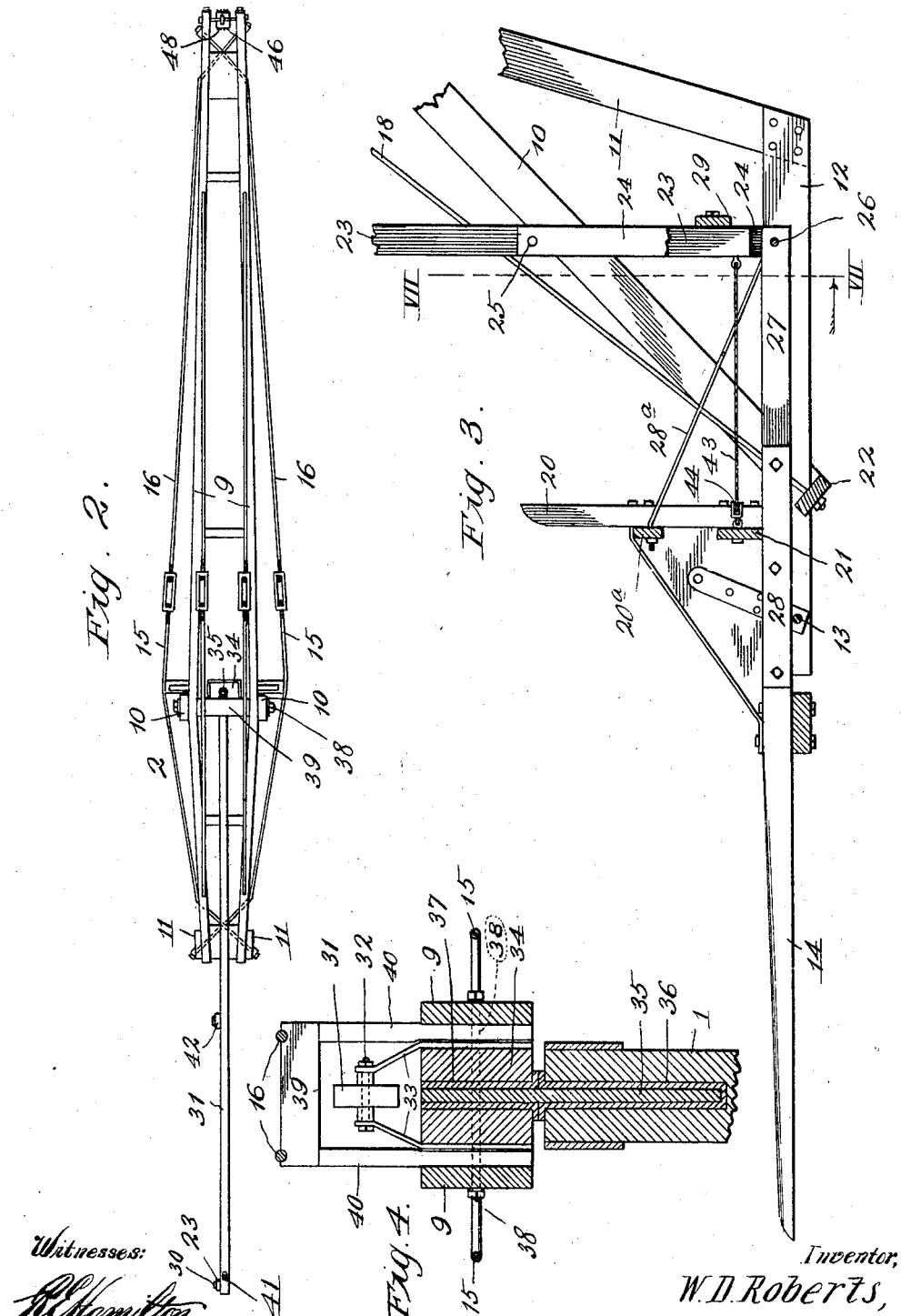

W. D. ROBERTS.
HAY STACKER.
APPLICATION FILED JULY 26, 1909.
967,975.
Patented Aug. 23, 1910.
3 SHEETS—SHEET 3.
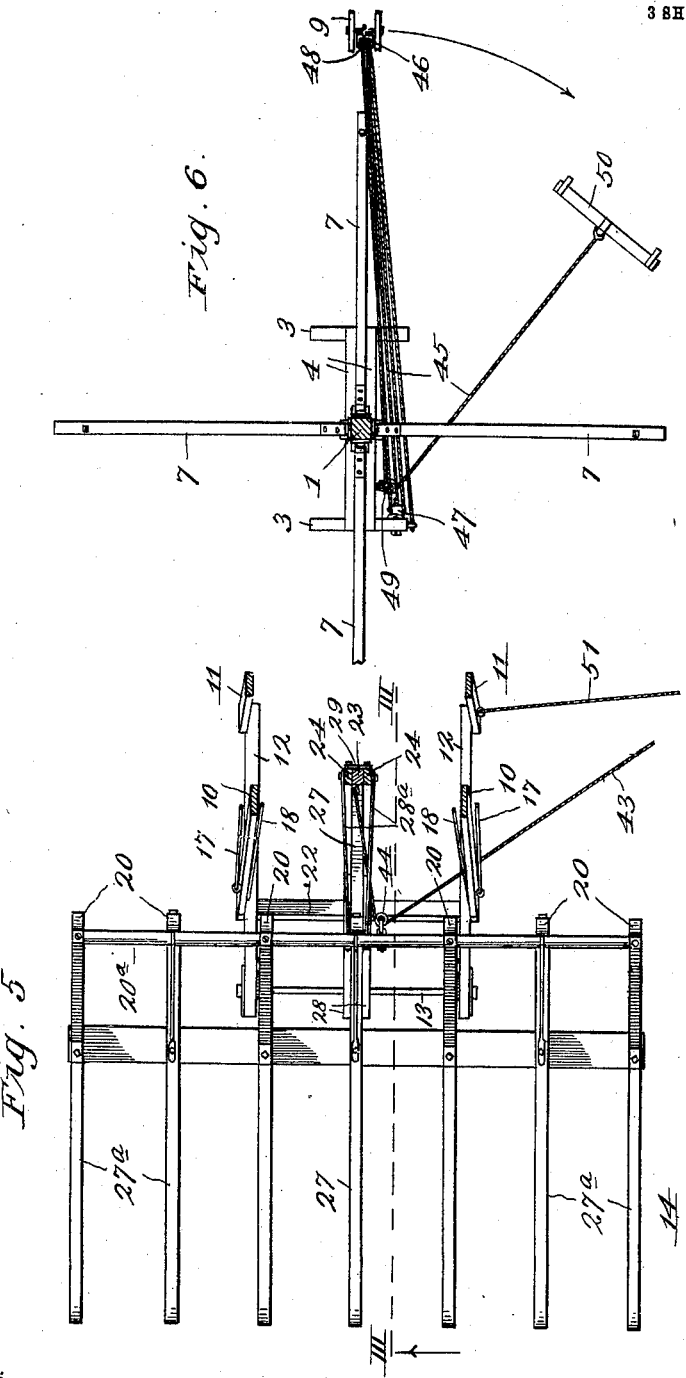
Witnesses:
R. E. Hamilton
M. Cox
Inventor,
W. D. Roberts,
By F. G. Fischer,
Atty.

UNITED STATES PATENT OFFICE.

WILLIAM D. ROBERTS, OF INDEPENDENCE, MISSOURI.

HAY-STACKER.

967,975.

Specification of Letters Patent. Patented Aug. 23, 1910.

Application filed July 26, 1909. Serial No. 509,689.

*To all whom it may concern:*

Be it known that I, WILLIAM D. ROBERTS, a citizen of the United States, residing at Independence, in the county of Jackson and State of Missouri, have invented certain new and useful Improvements in Hay-Stackers, of which the following is a specification.

My invention relates to improvements in hay-stackers, and my object is to provide a substantial machine of this character which is simple in construction and operation, and capable of lifting heavy hay and grain.

In the accompanying drawings, which illustrate the invention: Figure 1 shows a side elevation of the stacker in position for transportation from one part of a field to another. Fig. 2 is a plan view of the upper portion of the boom forming part of the invention. Fig. 3 is an enlarged sectional view on line III—III of Fig. 5, showing the fork and the adjacent parts of the stacker. Fig. 4 is an enlarged vertical section on line IV—IV of Fig. 1. Fig. 5 is an irregular horizontal section on line V—V of Fig. 1. Fig. 6 is a horizontal section on line VI—VI of Fig. 1, with the mast of the stacker and the runners carrying the same turned at right angles to that shown in Fig. 1. Fig. 7 is a detail fragmentary view of the means for preventing forward movement of the fork when loaded by a trigger.

In carrying out the invention I employ a derrick consisting of a mast 1 and a boom 2, which latter is arranged to swing both in a horizontal plane and a vertical plane upon the former. Mast 1 is mounted upon a pair of runners 3, so that it may be moved short distances in the field, said mast being secured to the runners by a pair of cross-bars 4 and a pair of braces 5.

6 designates a wheeled-truck upon which the stacker is mounted when it is desired to move the same any considerable distance. When in an operative position, truck 6 is removed to allow the runners 3 to rest directly upon the ground, where they are assisted in holding the mast in an upright position by four supporting-legs 7, swiveled at their upper ends to the mast and adapted to rest directly upon the ground when in an operative position. Legs 7 are prevented from spreading too far apart by cables 8 connected at their lower ends to the legs and the cross-bars 4.

Boom 2 consists of a walking-beam 9 and two pairs of intersecting arms 10 and 11, extending downwardly and forwardly from the walking-beam and connected at their lower terminals by a pair of forwardly-extending arms 12, united at their forward ends by a transverse shaft 13, upon which the fork 14 is pivotally-mounted. Walking-beam 9 is reinforced by truss-rods 15 and 16; arms 10 are reinforced by truss-rods 17, and arms 10 and 11 are reinforced by truss-rods 18. Arms 10 and 11 are connected by bolts 19 at their intersecting points to increase their rigidity. Fork 14 is provided at its rear end with vertical guards 20, and a stop 21, which latter is adapted to rest upon arms 12, and normally support the fork in the position shown in Figs. 1 and 3. Arms 12 are reinforced by a brace 22 which is also secured to the lower terminals of arms 10. The forward end of the fork is prevented from swinging downward when loaded by a trigger consisting of a depending arm 23, and a pair of bars 24 which latter are pivotally-secured at their upper ends by a pin 25 to the arm 23, and pivotally-secured at their lower ends by a pin 26 to the central tine 27 of the fork. Tine 27 extends backward of its companions 27ª to engage with the trigger, and is reinforced with a pair of bars 28 and a pair of braces 28ª, which latter extend from pin 26 to a cross-piece 20ª, which latter unites the intermediate portions of the guards 20. Bars 24 are provided near their lower ends with a stop 29, against which the lower end of arm 23 normally abuts to hold the pins 25 and 26 in alinement, as shown in Figs. 1 and 3. Arm 23 is pivotally-secured at its upper end by a pin 30 to a forwardly-extending beam 31, pivotally-secured by a pin 32 to a pair of vertical arms 33, secured to a block 34 fitting loosely between the longitudinal members of the walking-beam 9 and pivotally-secured to the mast 1 by a vertical shaft 35, so that boom 2 and beam 31 may swing in a horizontal plane. Mast 1 and block 34 are prevented from becoming worn by shaft 35 by bushings 36 and 37, secured, respectively, to said mast and block. Block 34 is provided with a transverse pivot 38 upon which the walking-beam 9 is pivotally-mounted to swing in a vertical plane.

39 designates a cross-bar for supporting the upper portions of the truss-rods 16, and 40 designates a pair of arms secured to the walking-beam 9 to support bar 39, see Figs. 1 and 4.

Beam 31 is reinforced by a truss-rod 41, and connected to arms 11 by a link 42 so that said beam may move vertically and laterally with the boom.

43 designates a cable attached to the lower terminal of arm 23 from which it extends forwardly and around a sheave 44, carried by stop 21.

45 designates a cable secured at its lower end to one of the runners 3, thence extends upward over a sheave 46, thence downward and around a sheave 47, thence upward around a sheave 48 and downward around a sheave 49, its free end being provided with a swingle-tree 50, to which a team may be hitched for actuating the boom. Sheaves 46 and 48 are carried by the upper rear portion of the walking-beam 9; sheave 47 is carried by one of the runners 3, and sheave 49 by one of the cross-bars 4.

In practice the stacker is removed from truck 6, and placed upon the ground with the runners 3 arranged at right angles to the walking-beam 9, as shown in Fig. 6, so that cable 45 will pull at an angle to said walking-beam, and thus tend to rotate the same block 34 upon the shaft 35. When a load of hay is deposited upon the fork, the same is hoisted by the team pulling upon the free end of cable 45, and as the boom swings upward, the fork will be maintained practically in a horizontal position by the arms 11, 23, and 42. As the boom swings upward, it is prevented from rotating on shaft 35 by an operator holding to a rope 51, secured to the lower end of one of the arms 11. After the boom has attained the desired height it is permitted to swing around over the stack by paying out the cable 51, and when the fork has attained the desired position over the stack, it is dumped by pulling on cable 43, which draws the lower end of arm 23 forward and causes the trigger to break at the pivot 25. After the fork has discharged its load its heavy rear portion will cause it to automatically right itself and set the trigger.

Having thus described my invention, what I claim is:—

1. A machine for stacking hay, comprising, in combination, a mast, a boom pivotally secured for vertical and horizontal movement to the upper end of said mast, a frame work suspended from the forward section of said boom, and comprising crossed suspending bars, and substantially horizontal bars connecting the lower ends of said suspending bars, a fork pivotally mounted on the lower end of said frame, a trigger mechanism overhanging said frame and connected to said fork, and means for actuating said boom.

2. A machine for stacking hay, comprising, in combination, a mast, a boom pivotally secured for vertical and horizontal movement to the upper end of said mast, a frame work suspended from the forward section of said boom, and comprising crossed suspending bars, and substantially horizontal bars connecting the lower ends of said suspending bars, a fork pivotally mounted on the lower end of said frame, a trigger mechanism overhanging said frame and connected to said fork, and means for actuating said boom, said trigger mechanism consisting of a beam having one end pivoted above the fulcrum point of said boom, a rod pivotally secured to the opposite end of said beam and pivoted by its other end to a portion of said fork, a flexible connection extended from a point above the pivotal connection with said fork to the top of said fork, and running through a pulley secured thereto, and a link pivotally secured to an intermediate point of said beam, and an intermediate point of said frame.

In testimony whereof I affix my signature, in the presence of two witnesses.

WILLIAM D. ROBERTS.

Witnesses:
F. G. FISCHER,
M. COX.